US012811685B2

(12) United States Patent
Shalunov

(10) Patent No.: US 12,811,685 B2
(45) Date of Patent: *Nov. 24, 2026

(54) FLASH-TO-CAMERA NON-RADIO COMMUNICATION CHANNEL

(71) Applicant: CLOSTRA, INC., San Francisco, CA (US)

(72) Inventor: Stanislav Shalunov, Miami, FL (US)

(73) Assignee: CLOSTRA, INC., San Francisco, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 18/582,335

(22) Filed: Feb. 20, 2024

(65) Prior Publication Data

US 2024/0195502 A1 Jun. 13, 2024

Related U.S. Application Data

(63) Continuation of application No. 17/806,656, filed on Jun. 13, 2022, now Pat. No. 11,923,903.

(60) Provisional application No. 63/215,880, filed on Jun. 28, 2021.

(51) Int. Cl.
*H04B 10/116* (2013.01)

(52) U.S. Cl.
CPC .................................. *H04B 10/116* (2013.01)

(58) Field of Classification Search
CPC .................................................... H04B 10/116
USPC .......................................................... 398/118
See application file for complete search history.

(56) References Cited

U.S. PATENT DOCUMENTS

| | | | | |
|---|---|---|---|---|
| 9,022,292 | B1 * | 5/2015 | van der Merwe | G06K 19/06037 235/383 |
| 9,559,772 | B2 * | 1/2017 | Chen | H04B 10/116 |
| 11,082,129 | B1 * | 8/2021 | Nayar | H04B 10/116 |
| 2009/0028558 | A1 * | 1/2009 | Choi | H04B 10/116 398/41 |
| 2015/0010308 | A1 * | 1/2015 | Uedaira | H04B 10/116 398/106 |
| 2015/0023669 | A1 * | 1/2015 | Jiang | H04B 10/116 398/118 |
| 2015/0065046 | A1 * | 3/2015 | Wilfred | H04W 12/50 455/41.2 |
| 2016/0173200 | A1 * | 6/2016 | Chaillan | H04B 10/116 398/115 |
| 2019/0355190 | A1 * | 11/2019 | Koo | G06F 21/00 |
| 2020/0153506 | A1 * | 5/2020 | Linnartz | H05B 47/195 |
| 2020/0382212 | A1 * | 12/2020 | Engelen | H05B 47/195 |
| 2022/0036022 | A1 * | 2/2022 | Fedtke | G06K 7/10722 |
| 2022/0114884 | A1 * | 4/2022 | Knapp | H04L 12/282 |

* cited by examiner

*Primary Examiner* — Dalzid E Singh
(74) *Attorney, Agent, or Firm* — Womble Bond Dickinson (US) LLP

(57) ABSTRACT

A method and apparatus of a device that transmits a message using a light pattern is described. In an exemplary embodiment, the device receives an indication to transmit a message using the light pattern. In addition, the device activates a flash on the device. The device further encodes the message into instructions for transmitting the light pattern. The device additionally transmits the message using the flash according to the instructions for the light pattern.

20 Claims, 7 Drawing Sheets

FLASH-TO-CAMERA NON-RADIO COMMUNICATION CHANNEL

CROSS-REFERENCE TO RELATED APPLICATION

This application is a continuation of co-pending U.S. application Ser. No. 17/806,656 filed Jun. 13, 2022, which claims the benefit of U.S. Provisional Patent Application No. 63/215,880 filed Jun. 28, 2021, both of which are incorporated herein by reference.

BACKGROUND

1. Field

Embodiments of the present invention relates generally to communication, more particularly to device to device communication using visible light patterns.

2. Related Arts

Smartphones are equipped with multiple radio communication protocols allowing them to interact directly with each other, which is desirable when Wi-Fi or cellular links are unavailable or overloaded. However, these connections are short-range and can be blocked or jammed.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

A method and apparatus of a device that transmits a message using a light pattern is described. In an exemplary embodiment, the device receives an indication to transmit a message using the light pattern. In addition, the device activates a flash on the device. The device further encodes the message into instructions for transmitting the light pattern. The device additionally transmits the message using the flash according to the instructions for the light pattern.

In another embodiment, a device that receives a message transmitted using a light pattern. The device activates a camera sensor on a device. The device further detects a light pattern emanating from another device. In addition, the device transforms the light pattern to a message and presents the message.

Other methods and apparatuses are also described.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

For a more complete understanding of the invention, reference is made to the following description and accompanying drawings, in which.

DETAILED DESCRIPTION

Figure 1:
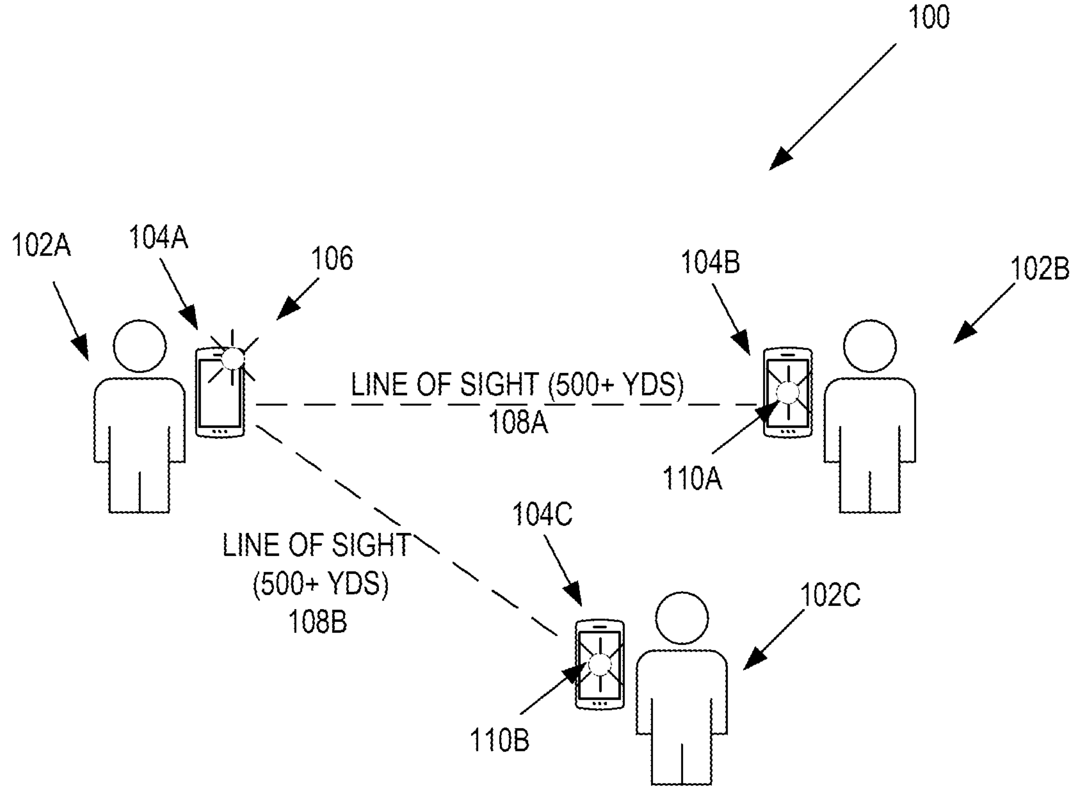
FIG. 1 is an illustration of an embodiment of one-to-one or one-to-many communications using a light pattern.

The following detailed description provides examples that highlight certain features and aspects of the innovative decentralized content distribution network claimed herein. Different embodiments or their combinations may be used for different applications or to achieve different results or benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

Disclosed embodiments provide a mechanism for transmitting and receiving a message using light patterns from a device (e.g., a smartphone using a camera flash and camera sensor of another smartphone). A smartphone is equipped with multiple radio communication protocols allowing them to interact directly with each other, which is desirable when Wi-Fi or cellular links are unavailable or overloaded. However, these connections are short-range and can be blocked or jammed.

In one embodiment, a form of low-bandwidth non-radio smartphone communication can be based on the smartphone's flashlight (also known as a camera flash or simply a flash). This communication operates by turning the flashlight on and off many times in a second to encode information. This flickering is then picked up by another phone's camera, which decodes the message and can send information back using the same method. Many smartphones allow programmatic access to the flashlight and camera.

This would have wide applications in situations with a lack of connection to the internet. At close ranges, phones can use direct radio connections (Wi-Fi direct, Bluetooth, BTLE, etc.) between devices. However, beyond a range of about thirty yards, these short-range communications can no longer connect. In situations like disaster relief with people stranded without internet connectivity and/or a small number of workers covering a large area, longer range direct connections would be invaluable.

This technology would take two forms: one where the blinking happens at the fastest possible speed, and one where there are pauses introduced that make it visible to the human eye that the light is flickering. The latter is advantageous for making it obvious to people that a signal is being sent out. This adds utility as a symbolic action (in situations like protests, where previously off-the-grid communications were tested, and both their utility and limitations were discovered) and helps attract attention in contexts of disaster relief and similar situations. Many protests have already seen people holding up their phones with the flashlight on. Extending this to encode a message in that flashlight would make the action more targeted and meaningful.

In one embodiment, a visual link can happen between a flashlight and a camera on each of a transmitting and receiving smartphone phones. This creates a use case where people can hold the phone and receive or transmit messages, while also seeing the message show up on the screen at the same time.

In one embodiment, a receiving smartphone method detects one or more light patterns (e.g., a blinking flash of a transmitting smartphone) in a video input using a machine learning algorithm. In addition, the receiving smartphone segments, classifies, and tracks the individual light sources to ensure a continuity of the messages. In this embodiment, this communication channel can be difficult to block, since it only needs line of sight to work.

FIG. 1 is an illustration of an embodiment of a system 100 for one-to-one or one-to-many communications 100 using light patterns. In FIG. 1, the system 100 includes different users 102A-C that includes devices 104A-C that are used to transmit and/or receive messages using a light pattern (e.g. a camera flash of the device 104A that is received by the camera sensors of the devices 104B and/or 104C). In one embodiment, each of the devices 104A-C is a device that is capable of transmitting and/or receiving a message using a light pattern (e.g., a device that includes a camera flash, flashlight, camera sensor, and/or another type of device that is capable of creating and/or capturing a one or more patterns on light), such as a smartphone, a cellular phone with a camera and/or a camera flash, camera, camera sensor, portable or fixed light tower, and/or another device capable emanating a light pattern and/or a device capable of capturing a light pattern.

In one embodiment, the user 102A inputs a message to be transmitted by the device 104A. In this embodiment, the device 104A activates the device light source 106. The device 104A further encodes the message into a light pattern and flashes the light source 106 based on at least the light pattern. In one embodiment, the device 104A flashes the light where the blinking happens at the fastest possible speed, or alternatively where there are pauses introduced that make it visible to the human eye that the light is flickering. The latter is advantageous for making it obvious to people that a signal is being sent out. This adds utility as a symbolic action (in situations like protests, where previously off-the-grid communications were tested, and both their utility and limitations were discovered) and helps attract attention in contexts of disaster relief and similar situations. In one embodiment, the frequency of the light pattern can depend on the hardware of the device 104A. In a further embodiment, the device 104A flashes a unique "start frame" bit pattern before each message frame. In one embodiment, the device can flash a message using a protocol for signaling, such as Morse code, International Code of Signals, and/or another type of signaling. Transmitting a message is further described in FIG. 3 below.

In another embodiment, the messaging from device 104A can be one-to-one messaging, for example, message(s) to the device 104B, and/or one-to-many, for example, where device 104A sends the message(s) to one or more of devices 104B-C. In this embodiment, one or more of devices 104B-C can receive the message by turning on the camera sensor, detecting the presence of the light pattern, recording the light pattern, and transforming the captured light pattern into the message, and displaying the message. Receiving a message is further described in FIG. 4 below. In one embodiment, device flash 104A will flash a unique "start frame" bit pattern before each message frame. The receiving devices 104B-C will use a trained neural network to perform image segmentation to identify signals in the received video frames and classify each identified flashlight in each video frame into either a light-on or light-off state. For each received flashlight signal 110A-B, this results in a series of bits that can be decoded to receive a frame of the signal. With the frame of the signal, the receiving devices 104B-C can further transform the signal frame into a segment of the message or the message itself. The receiving devices 104B-C can further present the received message to the user 102B-C using the user interface of the device 104B-C.

In one embodiment, because the messaging is based on using a light pattern emanated by device 104A that is received by the camera sensors of devices 104B and/or 104C, this type of messaging is based on line of sight 108A-B. Line of sight messaging 108A-B can be difficult to block or jam as any camera sensors that can visibly acquire the light pattern from device 104A can receive the message. Line of sight messaging 108A-B can have a range of 500 yards or more depending on the strength of the transmitting signal, environmental conditions, camera sensor sensitivity, and/or other factors. While in one embodiment, two receiving devices are illustrated (104A-B), in alternate embodiments, there can more or less numbers of receiving devices.

Figure 2:
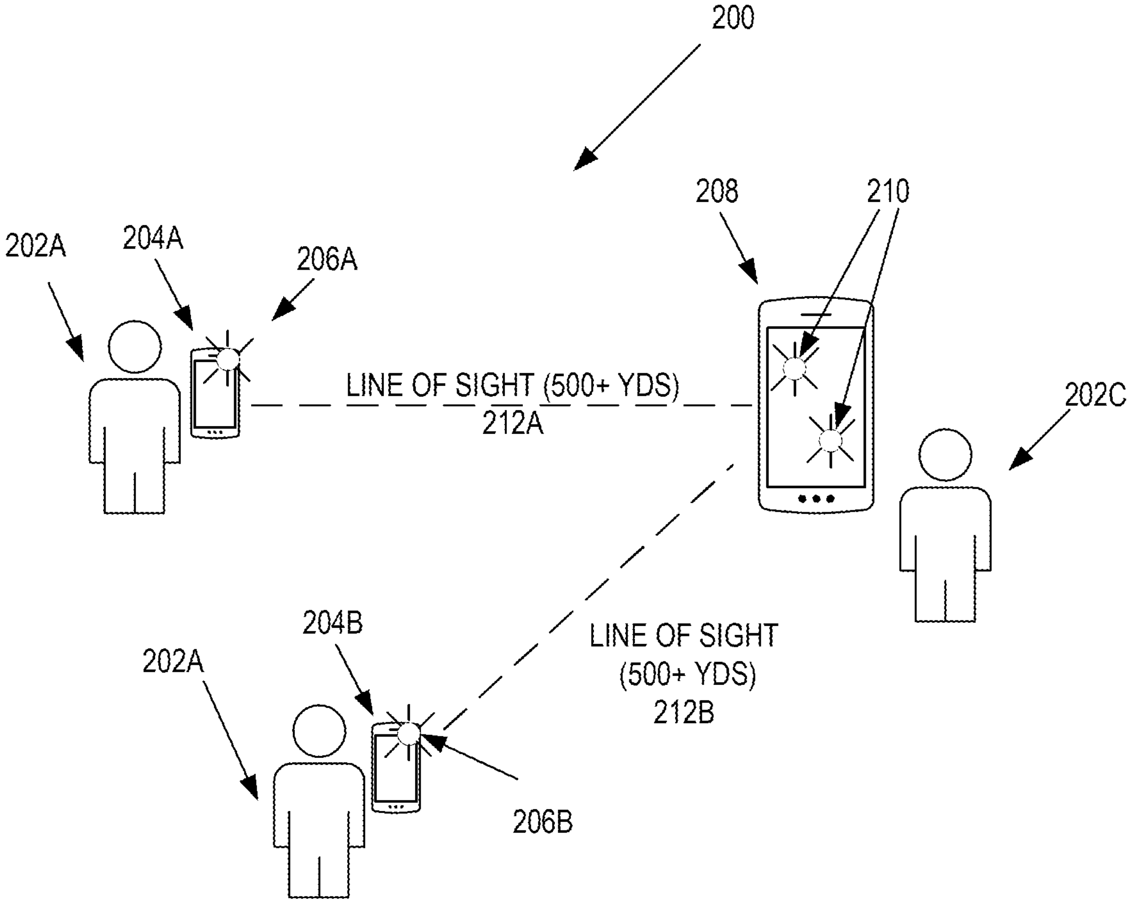
FIG. 2 is a block diagram of an embodiment of many-to-one communications using light patterns.

In FIG. 1, the receiving devices (e.g., devices 104B-C) can receive a message from one source (e.g., device 104A. In another embodiment, the receiving devices can receive messages from more than one transmitting device by detecting and decoding multiple light patterns. For example, and in one embodiment, a camera sensor can acquire light patterns from multiple transmitting devices and decode each of those light patterns. FIG. 2 is a block diagram of an embodiment of a system 200 for many-to-one communications using multiple light patterns. In FIG. 2, device 208 can receive messages encoded in light patterns from multiple devices (e.g., devices 204A-B). In one embodiment, device 208 is line of sight (212A-B) with devices 204A-B that are transmitting messages using the flash 206A-B of the devices 204A-B that are input by the users 202A-B. Device 208 can detect the separate light patterns 210. The device 208 can capture each of the light patterns from the devices 204A-B and decode each of the light patterns to receive the different messages. In one embodiment, device 208 uses a trained neural network to perform image segmentation to identify the separate set of signals in the received video frames and classify each identified flashlight in each video frame for each light detected into either a light-on or light-off state. For each of the received flashlight signals 210, this results in a series of bits that can be decoded to receive a frame of the signal. With the frame of the signal, the receiving device 208 can further transform the signal frame into a segment of the message or the message itself for each message emanating from devices 204A-B. The receiving device 208 can further present the received messages to the user 202C using the user interface of the device 208.

Figure 3:
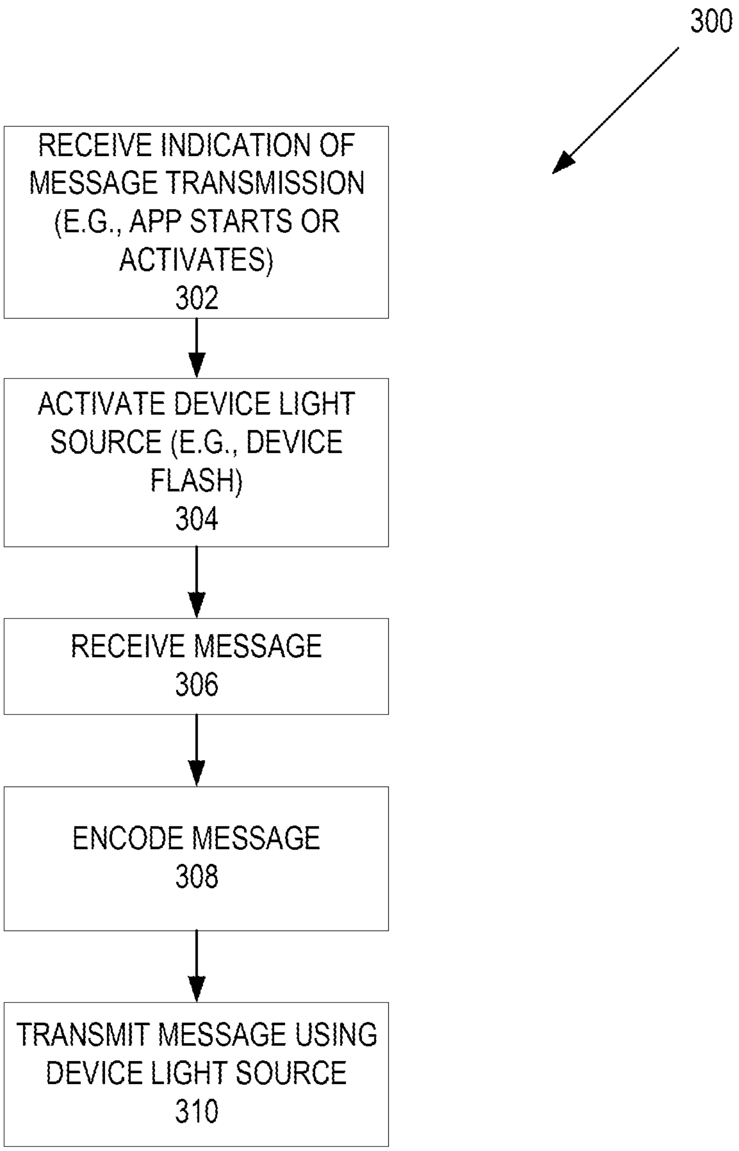
FIG. 3 is a flow diagram of an embodiment of a process to transmit a message using light patterns.

FIG. 3 is a flow diagram of an embodiment of a process 300 to transmit a message using light patterns. In FIG. 3, process 300 begins by receiving an indication of a request for a message transmission at block 302. In one embodiment, an application that runs on the device transmitting the device starts that uses the message transmission by a light pattern. Alternatively, an application is running but is selected to transmit a message using the light pattern.

At block 304, process 300 activates the device light source. In one embodiment, process 300 activates a camera flash of the device (or another light source of the device). Process 300 receives the message to transmit at block 306. In one embodiment, the application can receive the message input from a user. In this embodiment, the message can be input in a variety of means, such as receiving input text, voice to text, copy and paste, and/or another way of inputting a message.

Process 300 encodes the message at block 308. In one embodiment, process 300 encodes the message by converting the message into instructions for a light pattern that can be executed by the transmitting device. For example, and in one embodiment, the message can be converted into instructions for flashing the device flash according to Morse code or another type of protocol (e.g., International Code of Signals, and/or another protocol). At block 310, process 300 transmits the message using the device light source. In one embodiment, process 300 uses the instructions described in block 308 above to flash the device light source. In this embodiment, process 300 segments the message into a set of message frames and flashes a unique “start frame” bit pattern before each message frame. Process 300 transmits each message frame using the start frame bit and the light pattern instructions for that message frame.

Figure 4:
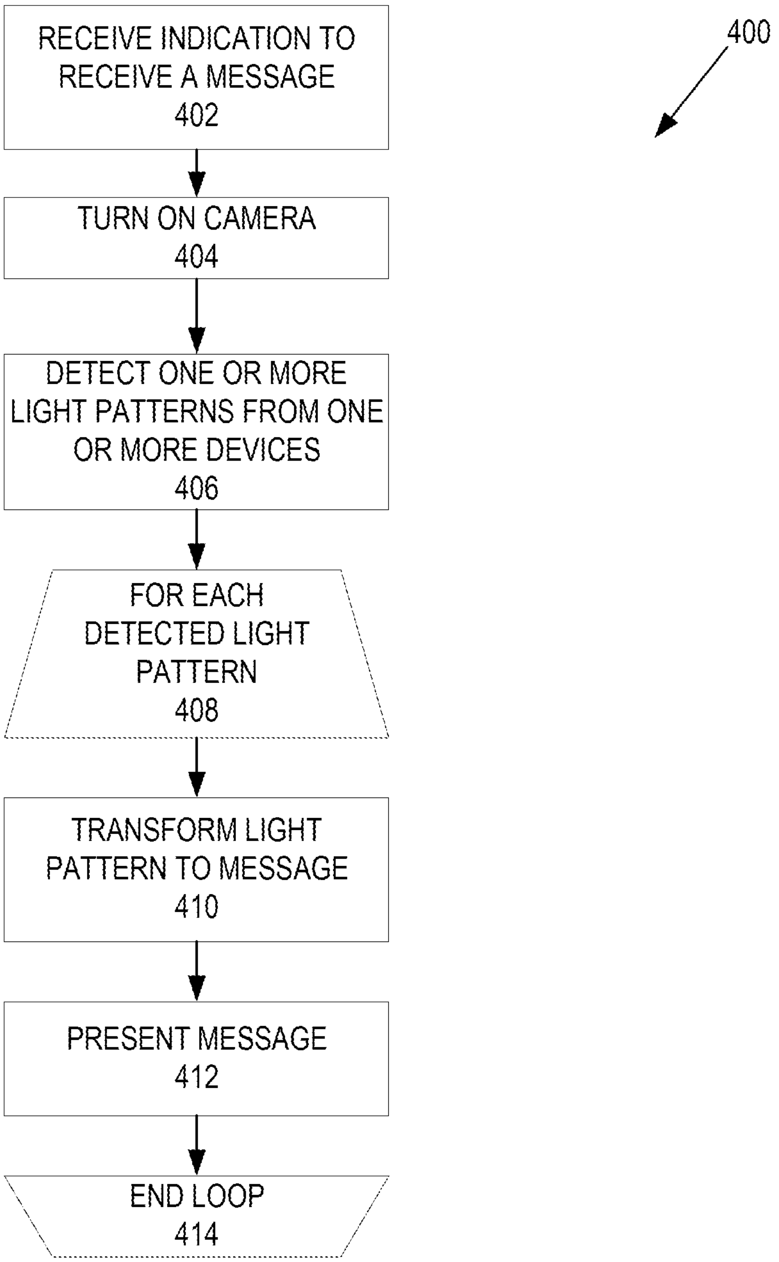
FIG. 4 is a flow diagram of an embodiment of a process to detect and receive a message transmitted using a light pattern.

FIG. 4 is a flow diagram of an embodiment of a process 400 to detect and receive a message transmitted using a light pattern. In FIG. 4, process 400 begins by receiving an indication to receive a message at block 402. Process 400 turns on the device camera at 404. Process 400 detects one or more light patterns from one or more devices at block 406.

Process 400 performs a processing loop at blocks 408-418 to retrieve a message for each detected light pattern. For each received flashlight signal, this results in a series of bits that can be decoded to receive a frame of the signal. With the frame of the signal, the receiving device can further transform the signal frame into a segment of the message or the message itself for each message emanating from devices. At block 410, process 400 transforms the light pattern to a message at block 410. In one embodiment, process 400 detects one or more light patterns by using a trained neural network to perform image segmentation to identify the separate set of signal in the received video frames and classify each identified flashlight in each video frame for each light detected into either a light-on or light-off state. Process 400 uses each light on or off state to determine a message using a protocol (e.g., Morse code, International Code of Signals, and/or some other protocol). Process 400 presents the message at block 412. In one embodiment, process 400 presents the message using a user interface of an application. The loop ends at block 414.

Figure 5:
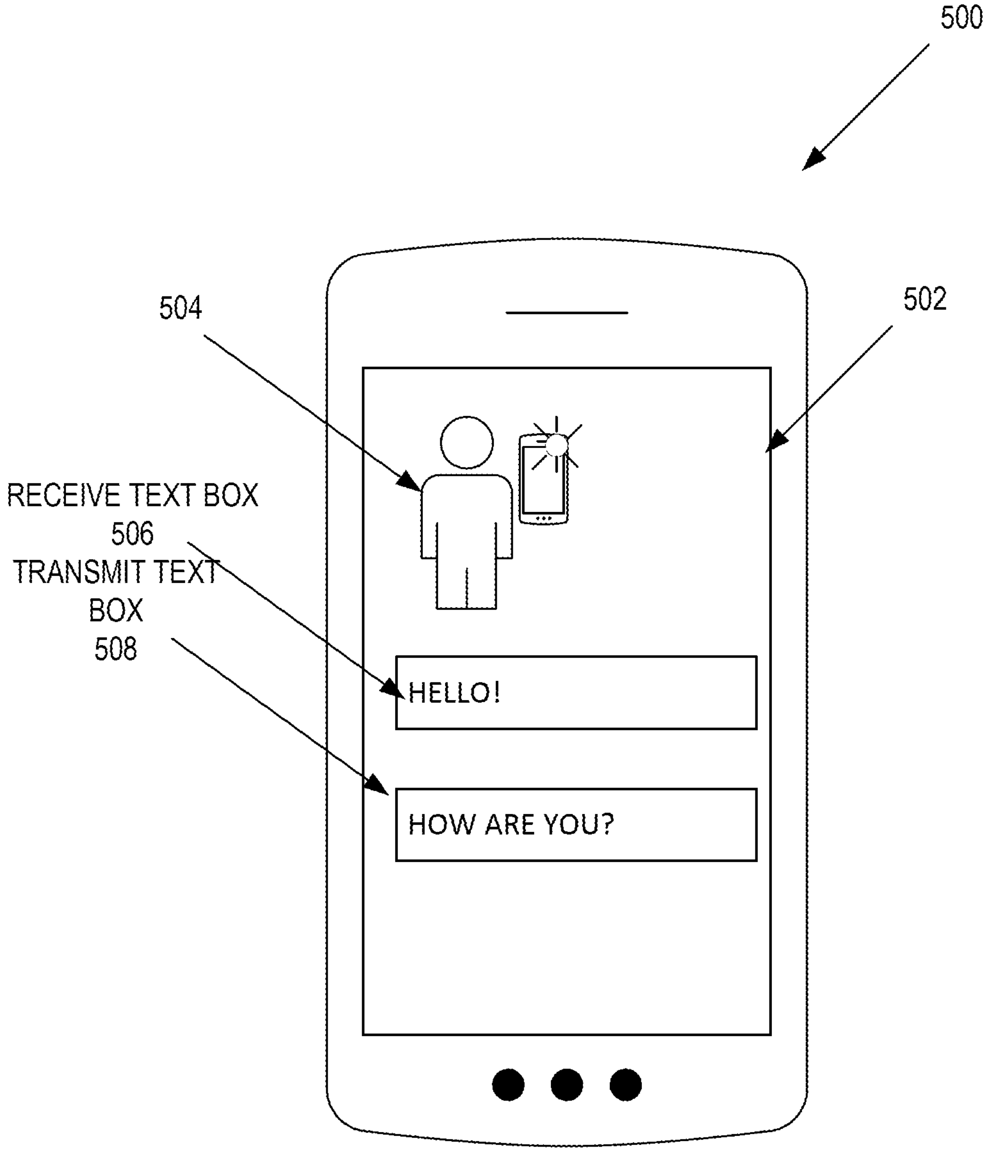
FIG. 5 is an illustration of an embodiment of a user interface to receive a message transmitted using a light pattern.

FIG. 5 is a flow diagram of an embodiment of a user interface 502 to receive a message transmitted using a light pattern. In FIG. 5, the device 500 includes a user interface 502. In one embodiment, the user interface 502 is a user interface of an application that can be used to receive and/or transmit messages. In one embodiment, the user interface 502 includes a user interface object 504 representing the transmitting device. Furthermore, the user interface can include a receive text box 506 that is used to display the received message. In addition, the user interface 506 can include a transmit box to input text to transmit a message.

Figure 6:
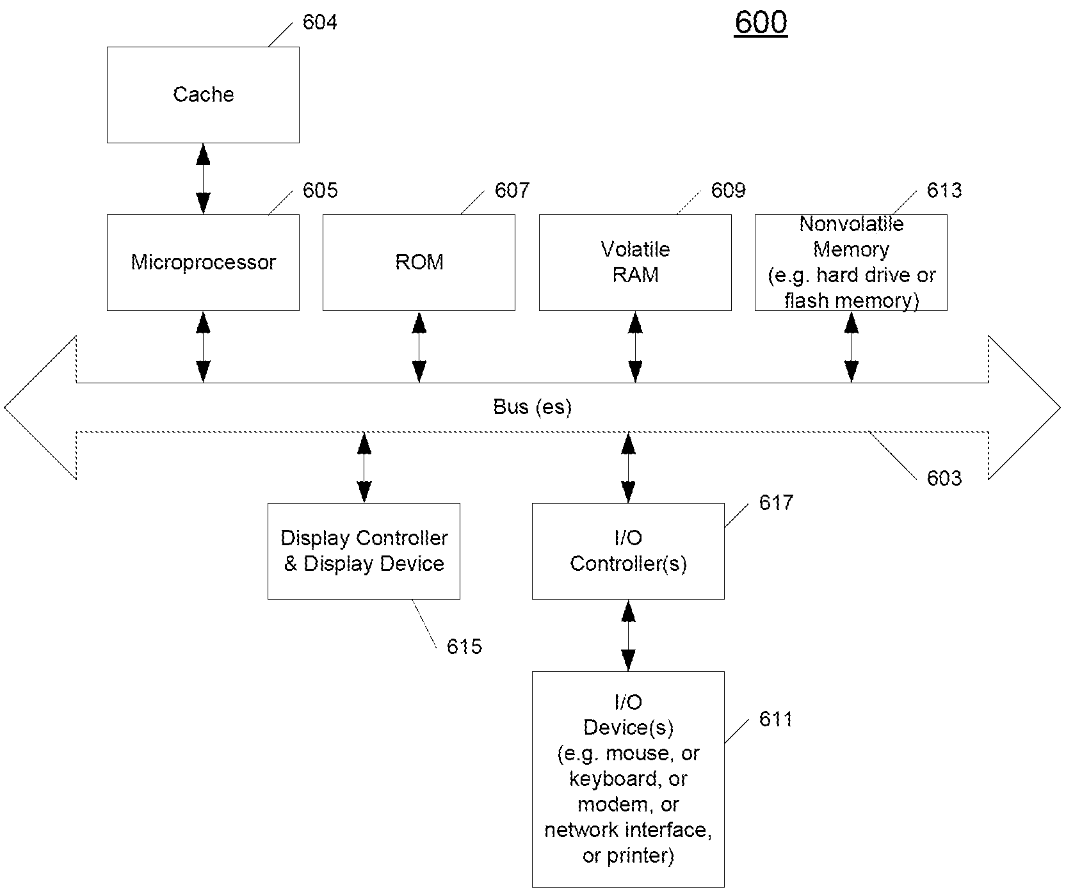
FIG. 6 illustrates one example of a typical computer system, which may be used in conjunction with the embodiments described herein.

FIG. 6 illustrates one example of a typical computer system, which may be used in conjunction with the embodiments described herein. For example, the system 600 may be implemented including one of the devices 104A-C as shown in FIG. 1 above. Note that while FIG. 6 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 6, the computer system 600, which is a form of a data processing system, includes a bus 603 which is coupled to a microprocessor(s) 605 and a ROM (Read Only Memory) 607 and volatile RAM 606 and a non-volatile memory 611. The microprocessor 605 may include one or more CPU(s), GPU(s), a specialized processor, and/or a combination thereof. The microprocessor 605 may retrieve the instructions from the memories 607, 609, 611 and execute the instructions to perform operations described above. The bus 603 interconnects these various components together and also interconnects these components 605, 607, 609, and 611 to a display controller and display device 616 and to peripheral devices such as input/output (I/O) devices which may be mice, keyboards, modems, network interfaces, printers and other devices which are well known in the art. Typically, the input/output devices 615 are coupled to the system through input/output controllers 613. The volatile RAM (Random Access Memory) 606 is typically implemented as dynamic RAM (DRAM), which requires power continually in order to refresh or maintain the data in the memory.

The mass storage 611 is typically a magnetic hard drive or a magnetic optical drive or an optical drive or a DVD RAM or a flash memory or other types of memory systems, which maintain data (e.g. large amounts of data) even after power is removed from the system. Typically, the mass storage 611 will also be a random access memory although this is not required. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 603 may include one or more buses connected to each other through various bridges, controllers and/or adapters as is well known in the art.

Figure 7:
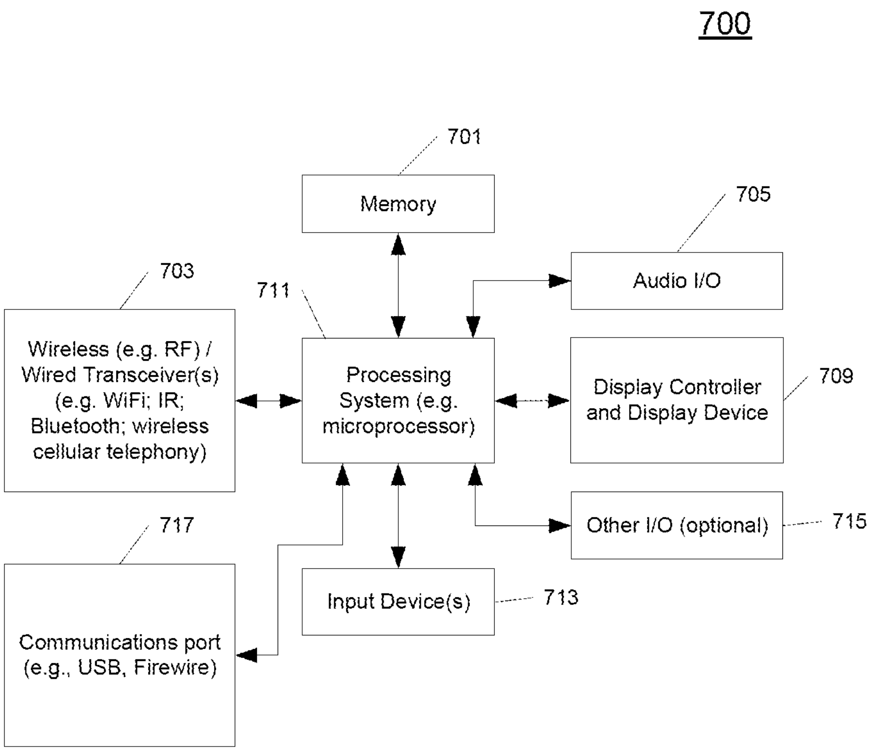
FIG. 7 shows an example of a data processing system, which may be used with one embodiment of the present invention.

FIG. 7 shows an example of a data processing system, which may be used with one embodiment of the present invention. For example, system 700 may be implemented as a device 104A or 104B as shown in FIG. 1 above. The data processing system 700 shown in FIG. 7 includes a processing system 711, which may be one or more microprocessors, or which may be a system on a chip integrated circuit, and the system also includes memory 701 for storing data and programs for execution by the processing system. The system 700 also includes an audio input/output subsystem 705, which may include a microphone and a speaker for, for example, playing back music or providing telephone functionality through the speaker and microphone.

A display controller and display device 709 provide a visual user interface for the user; this digital interface may include a graphical user interface which is similar to that shown on a computer when running operating system software with a graphical user interface, or smartphone when running an operating system with a graphical user interface, etc. The system 700 also includes one or more wireless transceivers 703 to communicate with another data processing system, such as the system 700 of FIG. 7. A wireless transceiver may be a WLAN transceiver, an infrared transceiver, a Bluetooth transceiver, and/or a wireless cellular telephony transceiver. It will be appreciated that additional components, not shown, may also be part of the system 700 in certain embodiments, and in certain embodiments fewer components than shown in FIG. 7 may also be used in a data processing system. The system 700 further includes one or more communications ports 717 to communicate with another data processing system, such as the system 600 of FIG. 6. The communications port may be a USB port, Firewire port, Bluetooth interface, etc.

The data processing system 700 also includes one or more input devices 713, which are provided to allow a user to provide input to the system. These input devices may be a keypad or a keyboard or a touch panel or a multi touch panel. The data processing system 700 also includes an optional input/output device 715 which may be a connector for a dock. It will be appreciated that one or more buses, not shown, may be used to interconnect the various components as is well known in the art. The data processing system shown in FIG. 7 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 700 may be a network computer or an embedded processing device within another device, or other types of data processing systems, which have fewer components or perhaps more components than that shown in FIG. 7.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMS, EPROMS, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMS, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "activating," "receiving," "decoding," "transforming," "presenting," "encoding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed:

1. A non-transitory machine-readable medium having executable instructions to cause one or more processing units to perform a method to receive a message transmitted using a light pattern, the method comprising:

activating a camera sensor on a first device;

capturing the light pattern, using the camera sensor, emanating from a second device using the flash of the second device, wherein the light pattern is captured over multiple frames;

transforming the light pattern to a message; and presenting the message on the first device.

2. The non-transitory machine-readable medium of claim 1, wherein the transforming comprises:

transforming the light pattern into an encoded message; and decoding the encoded message into the message.

3. The machine-readable medium of claim 1, wherein the message is encoded using a flash signal encoding.

4. The non-transitory machine-readable medium of claim 1, wherein the light pattern is a pattern of intermittent on and off flashes from the flash.

5. The non-transitory machine-readable medium of claim 1, further comprising:

detecting the light pattern using a machine learning algorithm.

6. The non-transitory machine-readable medium of claim 1, wherein the detecting the light pattern comprises:

detecting a plurality of light patterns from a plurality of devices.

7. The non-transitory machine-readable medium of claim 6, wherein the detecting a plurality of light patterns comprises:

detecting a plurality of messages from the plurality of light patterns.

8. The non-transitory machine-readable medium of claim 1, wherein the message is broadcast to one or more receiving devices.

9. The non-transitory machine-readable medium of claim 1, wherein the message is a one-to-one message to another device.

10. A method comprising:

activating a camera sensor on a first device;

capturing the light pattern, using the camera sensor, emanating from a second device using the flash of the second device, wherein the light pattern is captured over multiple frames;

transforming the light pattern to a message; and presenting the message on the first device.

11. The method of claim 10, wherein the transforming comprises:

transforming the light pattern into an encoded message; and decoding the encoded message into the message.

12. The method of claim 10, wherein the message is encoded using a flash signal encoding.

13. The method of claim 10, wherein the light pattern is a pattern of intermittent on and off flashes from the flash.

14. The method of claim 10, further comprising:

detecting the light pattern using a machine learning algorithm.

15. The method of claim 10, wherein the detecting the light pattern comprises:

detecting a plurality of light patterns from a plurality of devices.

16. The method of claim 15, wherein the detecting a plurality of light patterns comprises:

detecting a plurality of messages from the plurality of light patterns.

17. The method of claim 10, wherein the message is broadcast to one or more receiving devices.

18. The method of claim 10, wherein the message is a one-to-one message to another device.

19. A device comprising:

a camera sensor;

at least one processor;

a memory coupled to the processor though a bus; and a process executed from the memory by the processor that causes the processor to activate the camera sensor on the device, capture the light pattern, using the camera sensor, emanating from another device using the flash of the another device, transforming the light pattern to a message, and presenting the message on the device, wherein the light pattern is captured over multiple frames.

20. The device of claim 19, wherein the process causes the processor to transform the light pattern to the message by transforming the light pattern into an encoded message and decoding the encoded message into the message.

* * * * *